March 16, 1948.  W. J. MILLER ET AL  2,437,702
CONVEYER FOR TRANSPORTING POTTERY MOLDS
Filed May 7, 1943
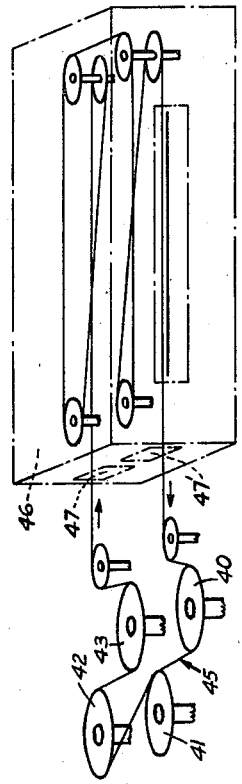
INVENTOR.
WILLIAM J. MILLER
ASHLEY J. REEK
BY George J. Croninger
ATTORNEY.

Patented Mar. 16, 1948

2,437,702

UNITED STATES PATENT OFFICE 2,437,702

CONVEYER FOR TRANSPORTING POTTERY MOLDS

William J. Miller, Swissvale, and Ashley J. Reek, Carrick, Pa., assignors to Miller Pottery Engineering Company, Swissvale, Pa., a corporation of Pennsylvania Application May 7, 1943, Serial No. 486,074

7 Claims. (Cl. 198—131)

This is a continuation, in part, of our copending application, Serial No. 392,276, filed May 7, 1941, and issued May 23, 1944 as Patent No. 2,349,292, and the invention hereof relates to new and improved methods and apparatus for transporting pottery molds along a path wherein clay is formed and dried thereon or therein, the invention having to do particularly with a novel form of conveyor of simplified design and construction, requiring less space to install and operate but having substantially the same mold carrying capacity as more cumbersome, complex and expensive conventional types of mold conveyor.

Furthermore, we propose to circulate molds over a production line in single file and to raise the molds to higher levels, during the period the ware is maturing, in long ascending paths that lie in a predominately horizontal plane and to lower the molds in the same fashion, the path ascending and descending in a spiral-like course to utilize to a maximum extent the area of a given space.

In one embodiment, carriers for the ware-forming molds are attached at spaced intervals to an endless strand of flexible sprocket chain capable of bending in a horizontal or vertical plane which is strung on horizontal sprockets that are mounted at predetermined levels on vertical sprocket shafts arranged in spaced apart relation so as to provide long ascending or descending chain courses therebetween, the angle of inclination of the chain between sprockets being predominately horizontal. In another embodiment, the molds are loosely supported in seats which are interconnected by strands of flexible material capable of bending in a horizontal or vertical plane, the whole forming an endless conveyor with the rings co-operating with corresponding notches in the sprockets to thereby establish a driving connection. In either embodiment, the mold carriers are preferably supported and guided along their path of travel, for instance by means of a track which receives rollers or wheels attached to the mold carriers. Furthermore, it is preferred that all sprockets rotate in a horizontal plane and that the mold conveyor approach and leave any given sprocket in the same plane as the sprocket. Thus, means are provided for guiding the chain in this fashion at least as it approaches or leaves any given sprocket.

Other objects and advantageous features will be noted in the accompanying drawings and written description wherein like reference characters designate corresponding parts and wherein:

Fig. 1 is a diagrammatic illustration of a mold conveying system embodying the principles of this invention as disclosed in the copending application above.

Fig. 2 is a fragmentary detail in perspective illustrative of a section of chain, track, sprocket, and a mold carrier of the apparatus of Fig. 1.

Fig. 3 is an end-view of one of the mold carriers resting on the track of Fig. 2.

Fig. 4 is a diagrammatic illustration of a mold conveying system embodying the principles of this invention associated with a dryer enclosure.

Fig. 5 is a plan view of another form of conveyor wherein the mold seats are interconnected by flexible members, the whole forming an endless conveyor.

Fig. 6 is a front elevation of the structure of Fig. 5.

Fig. 7 is a plan view of how the conveyor of Fig. 6 is strung around a sprocket, and also illustrating the form of sprocket employed.

The diagrammatic illustration of Fig. 1 is illustrative of how the principles of this invention would be employed in the slip casting of potteryware and the illustration of Fig. 4 depicts how the principles of this invention would be employed in the manufacture of jiggered or pressed ware. Slip casting is that procedure wherein an aqueous mixture of ceramic materials is poured into a separable mold and allowed to stand for a given interval until the solids precipitate in sufficient quantity and thickness on the wall of the molding cavity to form the body of the ware. Excess liquid is decanted and the mold then opened and the ware removed. Jiggering is that procedure wherein plastic clay is applied to the ware-forming surface of a plaster mold and subsequently pressed out and/or profiled to complete the shaping of the article. The clay and mold remain in adhesive association until the clay dries out sufficiently to loose its adhesiveness and releases from the mold. In either instance, there is an interval or period of time during which the ware matures and becomes stable enough to permit removal from the mold without becoming deformed.

The arrangement of Fig. 1 is illustrative of a slip casting system for forming and uniting slip cast appendages to prefabricated potteryware. The molds 1, Fig. 2 and Fig. 3 are separable and have an opening defining the terminal portion of the appendage (for instance a tea cup handle), which is sealed against the surface of the ware to which the appendage is to be attached. The mold is then filled with slip and after the appendage solidifies is removed from the mold united with the ware. The aforesaid system involves one or more automatic slip feeding machines described in detail in the copending application supra, whose sprockets 2, 3 and 4 are diagrammatically shown in Fig. 1 which is representative of one or more slip feeding or mold filling stations. After the molds have been filled, they are moved into a chamber 5 where atmospheric conditions are such as to expedite solidification of the contents of the mold, after which the product is removed and the mold cleaned and dried in chamber 6 preparatory to refilling at stations 2, 3 or 4.

The apparatus of this system comprises a single strand sprocket chain 7 which is wound around sprockets 2, 3 and 4, and has a horizontal course 8 stretching back to a horizontal sprocket 9 mounted for rotation on vertical shaft 10. This section of the conveyor is covered by a housing forming the entrance end of the solidification chamber and runs between tracks 11 which support the wheels 12 of mold carriers 13. Said mold carriers are attached to the chain at spaced intervals and each one mounts a separable slip casting mold 1 adapted to be automatically opened and closed at predetermined times during the trip around the circuit.

The lower course 8 of the chain conveyor bypasses vertical sprocket shaft 15 which is arranged in front of and in line with the rear shaft 10 and the chain is doubled back along an ascending, upwardly inclined path 16 which is predominately horizontal to the upper-level sprocket 17 on the upper end of shaft 15. The conveyor chain is flexible and adapted to bend around the sprockets and to flex vertically. The upper level course 18 of the chain is parallel to and above the lower course 8 and runs counter to the ascending course 16 over to sprocket 19 on top of shaft 10. This constitutes the initial section of the ascending courses of the conveyor which may have one or more spiral-like courses as described and be carried upwardly to any desired level by increasing the number of sprockets and chain courses.

Leaving sprocket 19, the chain crosses over in a horizontal, upper-level course 22 to the descending sprockets and is wound around sprocket 23 on vertical shaft 24, in line with and to one side of shaft 10 and is then carried forward to sprocket 25 on shaft 26 in a horizontal upper level course 27, the arrangement of the shafts being such that they are positioned at the four corners of a rectangle. The inclined descending course 28 of the chain which is also predominately horizontal doubles back to sprocket 29 on rear shaft 24 and is there carried forward in a horizontal lower course to sprocket 2 at the first filling station. The chamber 5 may be continuous or interrupted as illustrated and the ware transfer point 29a is marked by an interruption in the chamber and a trackside off bearing conveyor 30. Incoming ware reaches the system over an incoming conveyor 31 just ahead of the mold drying chamber 6. The descending chain is also arranged in a spiral-like course and may have as many convolutions as desired.

It is preferred that all sprockets rotate in a horizontal plane about a vertical axis and that the chain be guided onto the sprockets in a horizontal plane, which may be accomplished by leveling the track 11 at a point ahead of and behind any given upper level or lower level sprocket in the direction of chain travel. By providing ascending and descending carriers which run in inclined planes that are predominately horizontal there is no likelihood of the contents of the molds spilling out. Furthermore, the arrangement saves space and equipment. If desired, a stabilizing chain may be employed to provide greater stabilization for the molds in which case it would run parallel to and above the mold bearing chain on duplicate sprockets and connections would be made between each mold carrier and the chain. A fragment of the chain is illustrated in Fig. 1 at 32 with a connector 33 to the carrier 13 attached to the lower chain.

The arrangement of Fig. 4, by inspection, reveals the same general arrangement of ascending and descending conveyor courses as that illustrated in Fig. 1. The conveyor is reeved around a plurality of sprockets 40, 41, 42 and 43 and follows a tortuous path therebetween. These sprockets represent stations where potteryware is fabricated from plastic clay on jigger or press molds 44, Fig. 6, the stations in the order given representing clay feeding, pressing and jiggering (two stations) respectively. After the ware is formed, the conveyor 45 enters a dryer enclosure 46 through an opening 47 in which the ware travels until it emerges in dried condition through another opening 47' on the other side of the entrance.

The mold seats 48 in this instance are in the form of rings to which rollers 49 are attached to be received by track 50 which parallels the conveyor course. The ring seats are connected together by lengths of flexible cables 51, the whole forming an endless conveyor. The sprockets of this structure are as shown in Figs. 5 and 7. Each has a socket 52 shaped to fit the ring seat and in which the inside roller nests to stabilize the ring while in association therewith. The sprocket is grooved at 54 around the perimeter to receive the cable and the whole arrangement represents a driving connection as well.

Descending or ascending courses of the conveyor level off adjacent any given sprocket so that the approach will be made in line with the sprocket. Overhead guide and hold down rails 55, Fig. 7, are bent at the proper angle to lead the carrier wheels into the horizontal section 56 of the track adjacent any given sprocket. Fig. 7 is illustrative, on the left hand side, of an ascending course approaching a sprocket and on the right hand side, of a descending course leaving the sprocket. By reversing the direction of movement of the conveyor, the view is illustrative of a descending course of the conveyor. Any sprocket in the group, in Fig. 1 or 4 may be a drive sprocket. The mold seats 48, receive and support press or jigger molds M.

We claim:

1. A mold conveyor comprising, a plurality of rings each formed with a pair of oppositely disposed rollable elements and having an open seat for supporting a pottery mold so that it is accessible from below, flexible connections between said rings arranged to transmit the pull directly through said rings and a sprocket having peripheral recesses formed for receiving said rings and for interfitting relationship with one rollable element of each pair associated with a ring.

2. A mold conveyor comprising, a plurality of rings each formed with an open seat for supporting a pottery mold so that it is accessible from below, flexible connectors between said rings arranged to transmit the pull directly through said rings, a supporting wheel attached to each ring and a sprocket having peripheral recesses formed for receiving a ring and supporting wheel, said sprocket having a groove for receiving the flexible connectors.

3. A mold conveyor comprising, a plurality of rings each having a pair of oppositely disposed rollable elements and formed with an open seat for supporting a pottery mold so that it is accessible from below, flexible connections between said rings arranged to transmit the pull directly through said rings, a track for rollably supporting said rings and a sprocket having peripheral recesses therein formed for meshing with a ring and one of the rollable elements thereof and establishing a drive connection therewith.

4. A mold conveyor comprising, a plurality of rings each formed with an open seat for supporting a pottery mold so that it is accessible from below, flexible connectors attached to said rings so as to transmit the pull directly through said rings, oppositely disposed supporting wheels attached to each ring, a sprocket having peripheral recesses formed for receiving a ring and one of the supporting wheels attached thereto and a stationary support below the sprocket for receiving the other supporting wheel.

5. A mold conveyor comprising, a plurality of rings, each formed with an open seat for supporting a pottery mold so that it is accessible from below and having rollable elements attached thereto upon which said rings are moved from place to place, flexible members connecting said rings and arranged to transmit the pull directly through said rings, and a sprocket having peripheral recesses formed for receiving said rings.

6. A mold conveyor comprising, a plurality of rings, each formed with an open seat for supporting a pottery mold so that it is accessible from below and oppositely disposed coupling members, flexible members attached to said coupling members and arranged to transmit the pull directly through said rings, oppositely disposed wheels attached to each ring, a sprocket having peripheral recesses formed for interfitting relationship with a ring and one of the wheels attached thereto and a stationary support for receiving the other supporting wheel.

7. A mold conveyor comprising a plurality of open rings connected for travel in an endless path, rollers attached to each ring, a track for carrying said rings around the path and sprockets for said conveyor having peripheral ring receiving recesses formed with a roller receiving notch.

WILLIAM J. MILLER.
ASHLEY J. REEK.

REFERENCES CITED

The following references are of record in the file of this patent:

UNITED STATES PATENTS

| Number | Name | Date |
|---|---|---|
| 1,031,202 | Sample et al. | July 2, 1912 |
| 1,181,912 | Miller | May 2, 1916 |
| 1,507,800 | Smith | Sept. 9, 1924 |
| 1,614,056 | Ayars | Jan. 11, 1927 |
| 1,651,925 | Marsh | Dec. 6, 1927 |
| 1,668,427 | Sephton | May 1, 1928 |
| 1,826,759 | Finn | Oct 13, 1931 |
| 2,139,362 | Getty | Dec. 6, 1938 |